May 2, 1933.  R. E. SEARS  1,906,774
HEADING MACHINE FOR SHOCK CANE, KAFIR, AND THE LIKE
Filed April 21, 1931  5 Sheets-Sheet 2
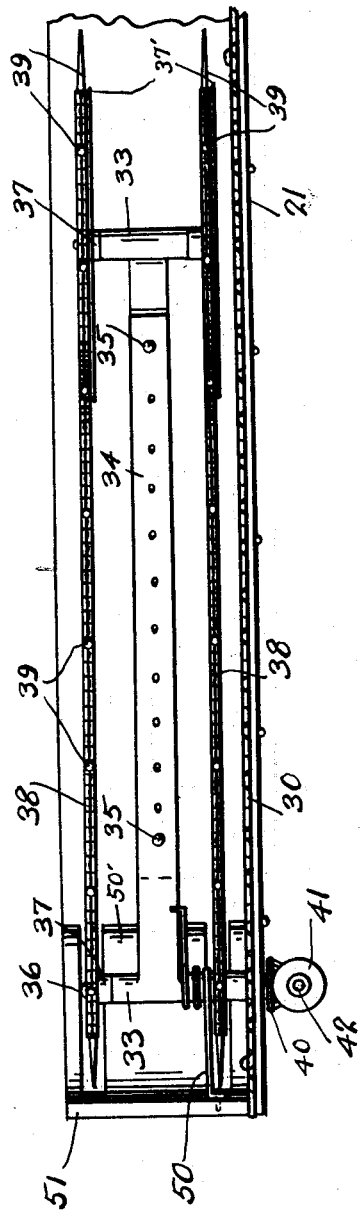
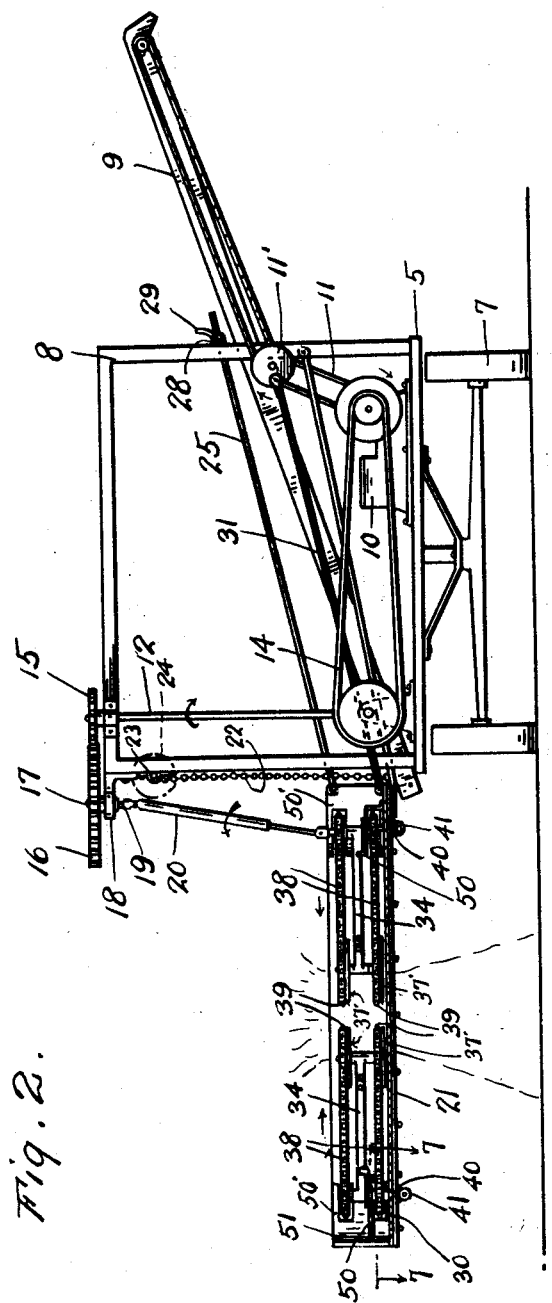
Fig. 3.
Fig. 2.
Inventor
R. E. Sears
By Clarence A. O'Brien
Attorney May 2, 1933. R. E. SEARS 1,906,774
HEADING MACHINE FOR SHOCK CANE, KAFIR, AND THE LIKE
Filed April 21, 1931  5 Sheets-Sheet 3
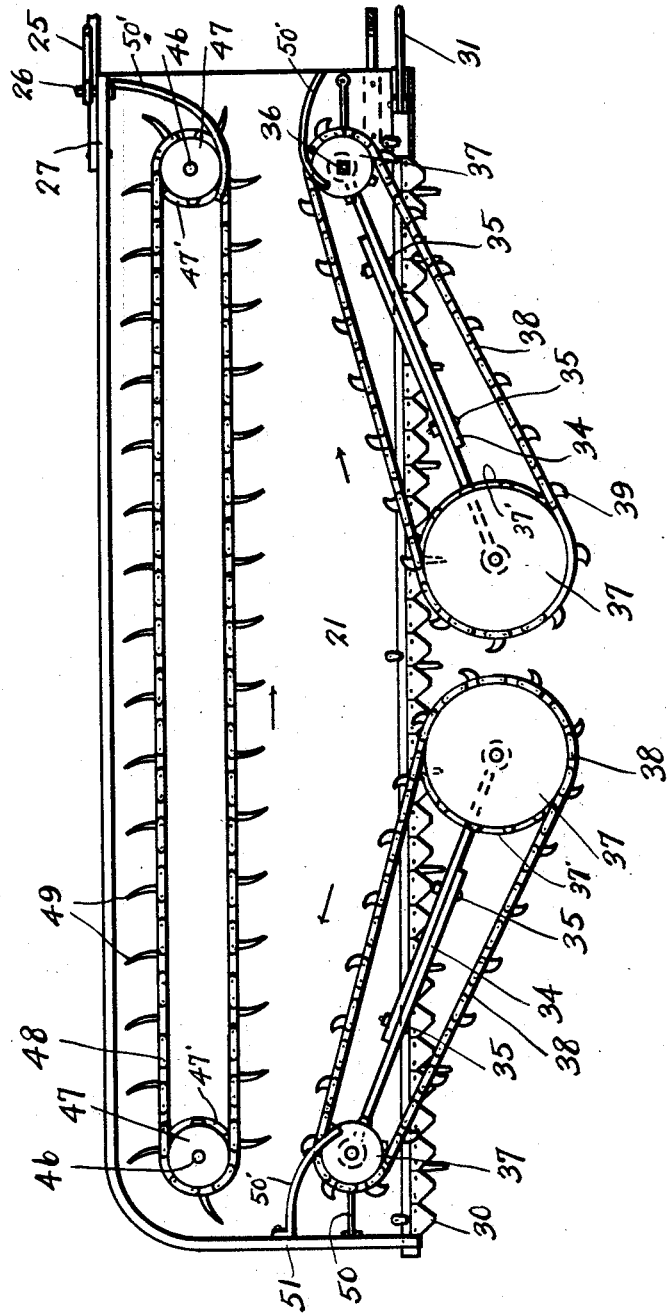
Inventor
R. E. Sears
By Clarence A. O'Brien
Attorney

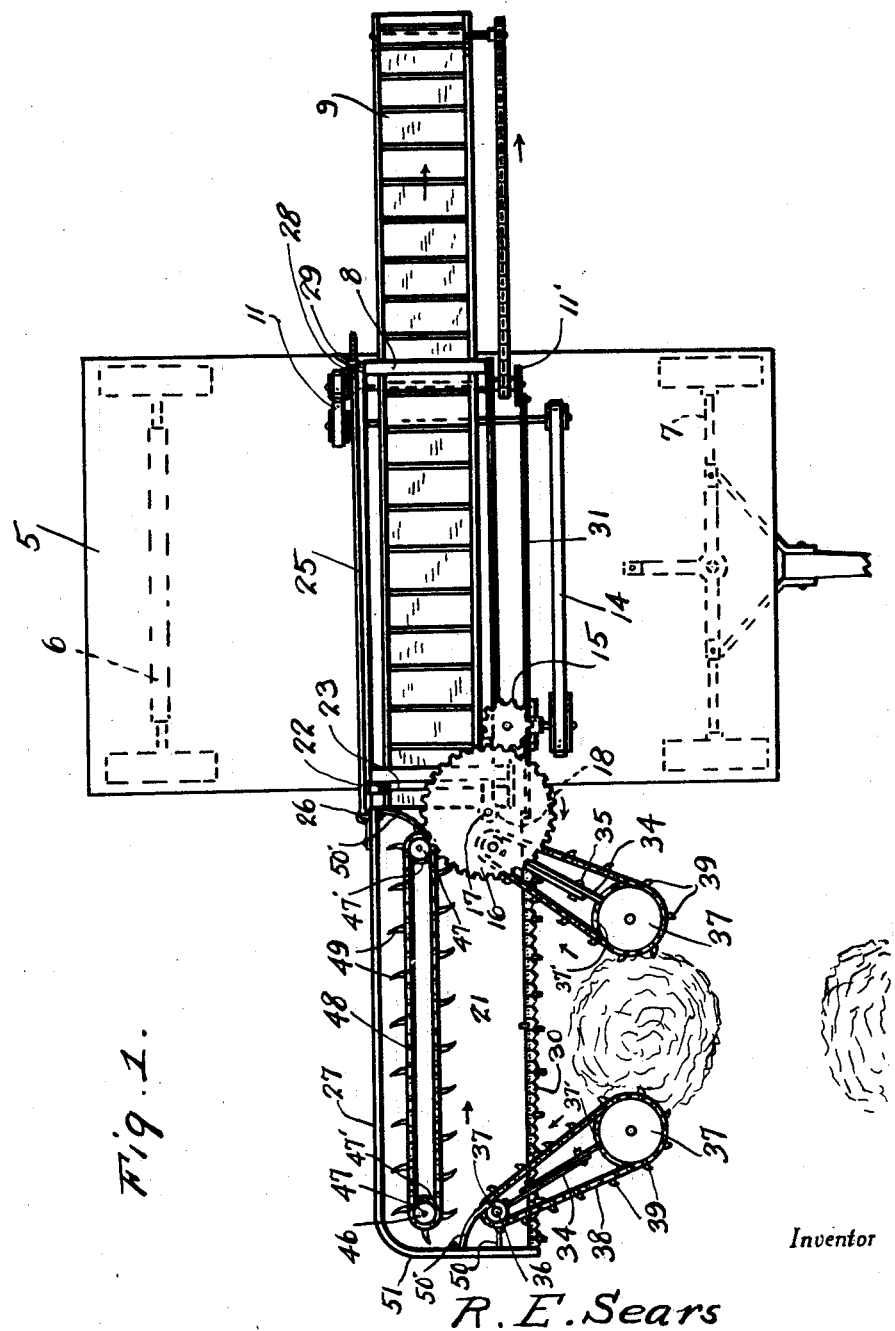

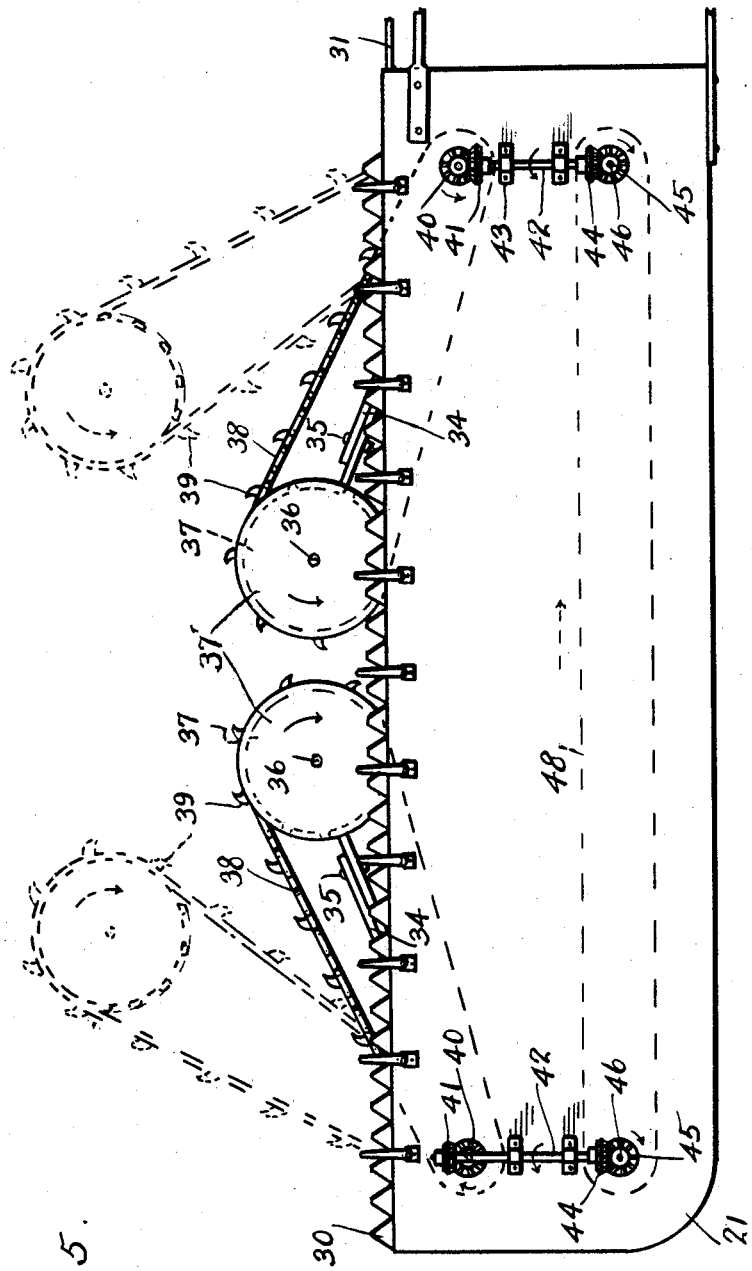

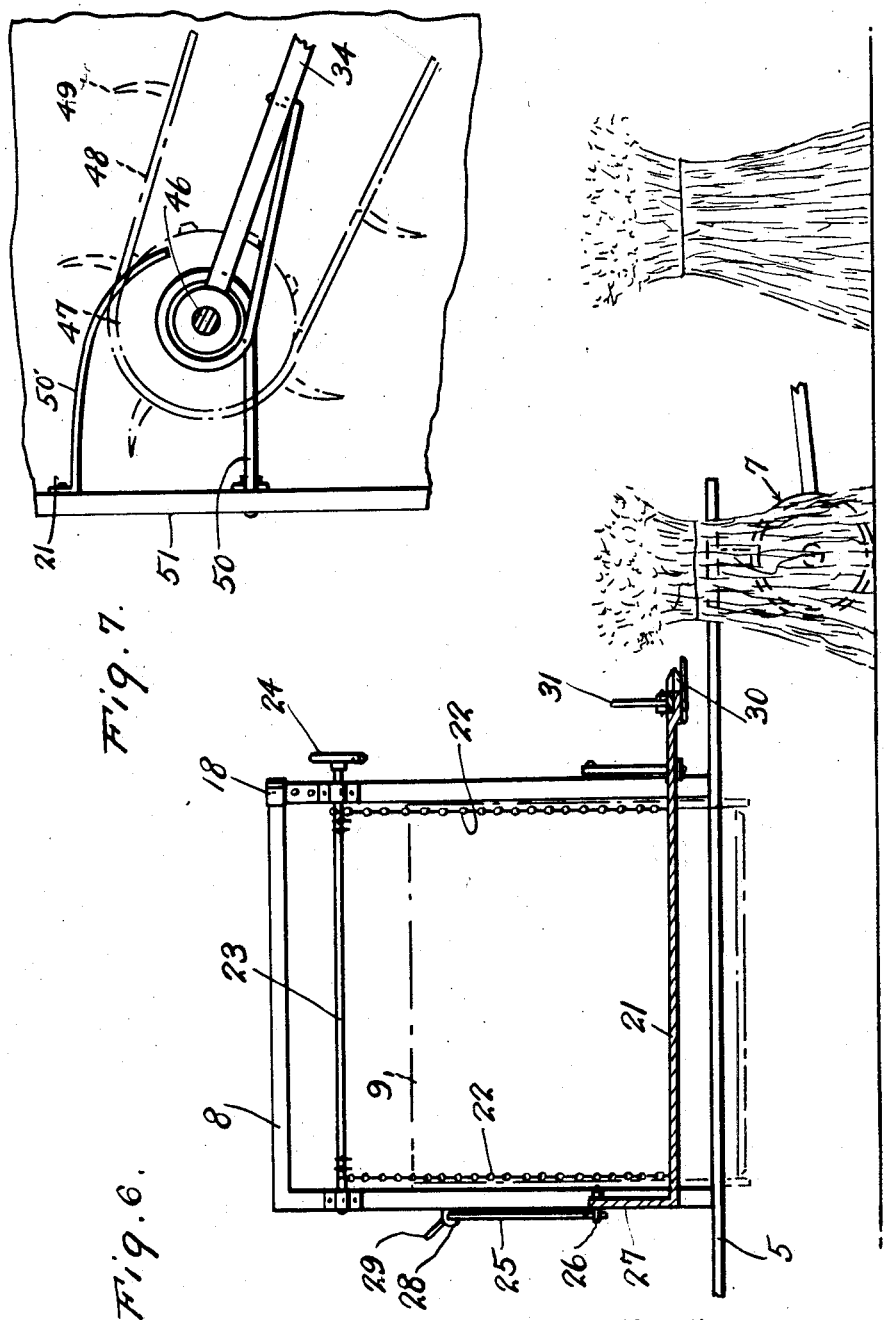

Patented May 2, 1933

1,906,774

UNITED STATES PATENT OFFICE

ROBERT E. SEARS, OF EUREKA, KANSAS

HEADING MACHINE FOR SHOCK CANE, KAFIR, AND THE LIKE

Application filed April 21, 1931. Serial No. 531,809.

The present invention relates to a machine for heading or topping cane, kafir and the like in one continuous operation from the shock and the prime object of the invention resides in the provision of a machine of this nature which is compact and convenient in its arrangement of parts, comparatively inexpensive to manufacture, easy to manipulate and adjust, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the machine embodying the features of my invention.

Figure 2 is a front elevation thereof.

Figure 3 is an enlarged detail view of one of the gathering mechanisms,

Figure 4 is a top plan view of the platform with the gathering mechanisms thereon.

Figure 5 is a bottom plan view of the platform.

Figure 6 is a vertical sectional view through the platform taken longitudinally thereof looking toward the wheeled frame.

Figure 7 is an enlarged detail sectional view taken substantially on the lines 7—7 of Figure 2.

Referring to the drawings in detail it will be seen that numeral 5 denotes a platform mounted on wheeled trucks 6 and 7 and having a super-structural frame 8 rising therefrom. An endless elevator mechanism 9 is disposed transversely in the frame 8 to incline upwardly from one side to the other and is driven by a suitable prime mover 10 by a pulley and belt mechanism or the like 11. A shaft 12 is vertically mounted in the frame and driven from the prime mover 10 by gearing and belt and pulley mechanism 14 of the like. A pinion 15 on the top of the shaft 12 meshes with a gear 16 on a shaft 17 journalled through a bracket 18 projecting laterally from the top of the frame 8 and having a flexible connection 19 with a shaft 20 formed in two telescopically associated sections.

Numeral 21 denotes a platform extending laterally from the frame 8 at one side thereof and has its inner end supported by chains 22 which are windable about a shaft 23 journalled across the upper portion of the frame and manipulatable by a wheel 24 or the like so that the inner end of the platform may be raised or lowered. A rod 25 as a connection 26 with back plate 27 of the platform 21 and extends through a lug 28 projecting from the platform and has a nut 29 on the end thereof which may be turned to adjust the rod 25 so as to properly level the platform.

In this way it will be seen that the height of the platform may be adjusted in accordance with the shocks to be headed. On the front edge of the platform 21 there is a conventional cutter 30 preferably of the well known reciprocating type which is actuated by a pitman 31 connected eccentrically with a pulley 11' forming part of the pulley and belt mechanism 11 previously referred to. The sprockets are flanged as at 37' and shields 50' are associated with the small sprockets to clean the heads from the fingers on the chains.

There are two gathering mechanisms on the platform each comprising a pair of vertical bearings 33 connected together by rods 34 overlapping each other and apertured so that bolts 35 may be used to bolt the rods together and hold the bearings 33 desired distances apart. Shafts 36 are journalled in these bearings 33 and have sprockets 37 on their upper and lower ends. Endless chains 38 are trained over these sprockets one above and one below the rods 34 and are formed with suitable outwardly directed fingers 39. The outer sprockets are larger in diameter than the inner sprockets. The shafts 36 of the inner sprockets are journalled through the platform 21 and have beveled gears 40 on their lower ends meshing with beveled gears 41 on shafts 42 journalled longitudinally of the platform in bearings 43 on the bottom thereof. The rear ends of these shafts 42 have beveled gears 44 meshing with beveled gears 45 on the lower end of shaft 46 journalled through the platform.

Sprockets 47 are mounted on the upper ends of these shafts 46 and an endless chain 48 is trained thereover having fingers 49 projecting outwardly therefrom.

One of the shafts 36 is connected with the shaft 20. Therefore the rotation of the shaft 20 will cause movement of the endless chains 38 and 48 in the direction of the arrows shown adjacent thereto in Figure 4. The outer ends of the gathering mechanisms are urged inwardly toward each other by springs 50 which are anchored to the side 51 rising from the platform, coiled about adjacent bearings 33 and anchored to adjacent rod 34 as is clearly illustrated in Figures 3 and 7.

From the above detailed description it will be quite apparent that as the machine is pulled along so that the shocks will be engaged by the forward outer portions of the gathering mechanisms said gathering mechanisms will gather the shocks in toward the oncoming cutter mechanism so as to sever or head the tops of the shocks therefrom on to the platform and the endless chain 48 will then cause these heads to come into engagement with the bottom end of the endless elevator so that they may be dumped into a wagon or the like running alongside of the machine.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a machine of the class described, a wheeled frame, a platform extending outwardly and laterally from the wheeled frame, a pair of endless gathering mechanisms on the platform projecting forwardly therefrom and means associated with said mechanisms to urge the forward ends toward each other, and a cutting mechanism across the forward edge of the platform, an endless chain, means for mounting the endless chain in an elongated transverse orbit on the rear portion of the platform, and fingers projecting outwardly from the chain.

2. In a machine of the class described, a wheeled frame, a platform extending outwardly and laterally from the wheeled frame, a pair of endless gathering mechanisms on the platform projecting forwardly therefrom and means associated with said mechanisms to urge the forward ends toward each other, and a cutting mechanism across the forward edge of the platform, chains engaged with the platform at its end adjacent the frame, a shaft on which said chains are windable, means for journalling the shaft on the frame above the platform so that the platform may be raised and lowered.

3. In a machine of the class described, a wheeled frame, a platform extending outwardly and laterally from the wheeled frame, a pair of endless gathering mechanisms on the platform projecting forwardly therefrom and means associated with said mechanisms to urge the forward ends toward each other, and a cutting mechanism across the forward edge of the platform, chains engaged with the platform at its end adjacent the frame, a shaft on which said chains are windable, means for journalling the shaft on the frame above the platform so that the platform may be raised and lowered, and a rod engaged with the platform and extending through a lug on the frame and a nut on the rod to adjust the same for levelling the platform.

4. In a machine of the class described, a wheeled frame, a platform extending outwardly and laterally from the wheeled frame, a pair of endless gathering mechanisms on the platform projecting forwardly therefrom and means associated with said mechanisms to urge the forward ends toward each other, and a cutting mechanism across the forward edge of the platform, each mechanism comprising a rod formed in sections adjustably connected together, vertical bearings on the ends of the rod, shafts journalled through said bearings, sprockets on the upper and lower ends of the shafts, endless chains trained over the sprockets, said shafts being journalled through the platform, and means for operating the shafts.

5. In a machine of the character described, an endless conveyor, an endless gathering mechanism mounted adjacent each end of the conveyor, means for supporting said gathering mechanisms for movement relative to one another and to said conveyor whereby said gathering mechanisms may be arranged so as to approach one another remote from the conveyor as they proceed toward one end laterally with respect to the conveyor.

6. In a machine of the class described, an endless conveyor, endless gathering mechanisms arranged one adjacent each end of the conveyor, means for mounting said gathering mechanisms for lateral movement relative to one another and angular movement with respect to the conveyor and a cutter paralleling the endless conveyor and arranged to engage the material gathered as it is carried by the gathering mechanisms toward said conveyor.

In testimony whereof I affix my signature.

ROBERT E. SEARS.